(12) United States Patent
Hsueh et al.

(10) Patent No.: US 9,798,981 B2
(45) Date of Patent: Oct. 24, 2017

(54) DETERMINING MALWARE BASED ON SIGNAL TOKENS

(71) Applicant: HEWLETT-PACKARD DEVELOPMENT COMPANY, L.P., Houston, TX (US)

(72) Inventors: Frank Chijeen Hsueh, Sunnyvale, CA (US); Sejal Pranlal Kamani, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 26 days.

(21) Appl. No.: 14/787,852

(22) PCT Filed: Aug. 27, 2013

(86) PCT No.: PCT/US2013/056828
§ 371 (c)(1),
(2) Date: Oct. 29, 2015

(87) PCT Pub. No.: WO2015/016952
PCT Pub. Date: Feb. 5, 2015

(65) Prior Publication Data
US 2016/0094574 A1    Mar. 31, 2016

(30) Foreign Application Priority Data
Jul. 31, 2013    (WO) ............... PCT/US2013/052983

(51) Int. Cl.
*H04L 29/06*    (2006.01)
*G06N 7/00*    (2006.01)
*G06F 21/56*    (2013.01)

(52) U.S. Cl.
CPC ........... *G06N 7/005* (2013.01); *G06F 21/566* (2013.01); *H04L 63/1416* (2013.01); *H04L 63/1433* (2013.01)

(58) Field of Classification Search
USPC .............................................. 726/23, 24, 25
See application file for complete search history.

(56) References Cited

U.S. PATENT DOCUMENTS 7,096,502 B1 *  8/2006  Fox ...................... H04L 41/28
                                                    707/999.008
7,624,449 B1    11/2009  Perriot
7,809,670 B2    10/2010  Lee et al.
(Continued)

FOREIGN PATENT DOCUMENTS

CN    101017458    8/2007
CN    101356535    1/2009
(Continued)

OTHER PUBLICATIONS

International Search Report & Written Opinion, Apr. 28, 2014, PCT Patent Application No. PCT/US2013/056828, 10 pages.
(Continued)

*Primary Examiner* — Jason Lee (57) ABSTRACT

Example embodiments disclosed herein relate to determining malware. A set of tokens is generated from an application under test, A set of signal tokens is generated from the set of tokens. A likelihood of malware is determined for the application under test based on the signal tokens and a signal token database.

17 Claims, 4 Drawing Sheets

(56) References Cited

U.S. PATENT DOCUMENTS

| | | | |
|---|---|---|---|
| 7,882,187 B2 | 2/2011 | Gammage et al. | |
| 8,176,554 B1 | 5/2012 | Kennedy | |
| 8,787,681 B1* | 7/2014 | Rubio | G06K 9/00442 |
| | | | 382/224 |
| 2003/0065926 A1 | 4/2003 | Schultz et al. | |
| 2003/0212902 A1 | 11/2003 | van der Made | |
| 2005/0080860 A1* | 4/2005 | Daniell | H04L 51/12 |
| | | | 709/206 |
| 2007/0074169 A1 | 3/2007 | Chess et al. | |
| 2007/0094734 A1 | 4/2007 | Mangione-Smith et al. | |
| 2009/0089869 A1* | 4/2009 | Varghese | G06F 21/31 |
| | | | 726/7 |
| 2009/0320133 A1 | 12/2009 | Viljoen et al. | |
| 2010/0162395 A1 | 6/2010 | Kennedy | |
| 2011/0302654 A1 | 12/2011 | Miettinen | |
| 2012/0260342 A1 | 10/2012 | Dube et al. | |
| 2012/0266244 A1 | 10/2012 | Green et al. | |
| 2013/0067579 A1 | 3/2013 | Beveridge et al. | |
| 2013/0097706 A1 | 4/2013 | Titonis et al. | |
| 2013/0111547 A1 | 5/2013 | Kraemer | |

FOREIGN PATENT DOCUMENTS

| | | |
|---|---|---|
| CN | 101753570 | 6/2010 |
| CN | 101814053 | 8/2010 |
| CN | 103177215 | 6/2013 |
| EP | 2182460 A2 | 5/2010 |
| EP | 2199941 A2 | 6/2010 |
| JP | 2012027710 A | 2/2012 |

OTHER PUBLICATIONS

Rieck, K., et al., Automatic Analysis of Malware Behavior Using Machine Learning, Dec. 13, 2010, Journal of Computer Security, IOS Press, Preprint, 30 pages.

Extended European Search Report dated Feb. 24, 2017 for EP application No. 13890383.6; pp. 8.

Chinese Office Action issued in CN201380076192.8 dated May 2, 2017.

European Search Report issued in EP13890596.3 dated Apr. 12, 2017.

* cited by examiner

DETERMINING MALWARE BASED ON SIGNAL TOKENS

CROSS-REFERENCE TO RELATED APPLICATIONS

This application claims priority to International Patent Application No. PCT/US2013/052983 entitled "Signal Tokens Indicative of Malware" and filed Jul. 31, 2013.

BACKGROUND

Service providers and manufacturers are challenged to deliver quality and value to consumers, for example by providing applications to users. Computer systems and personal computers have been targets of malware or malicious software programs. Further, malware developers have started developing malware for mobile devices such as smartphones.

BRIEF DESCRIPTION OF THE DRAWINGS

The following detailed description references the drawings, wherein.

DETAILED DESCRIPTION

Malware attacks are being written towards mobile devices such as smartphones and tablets. Mobile malware is rising and is threatening to steal money from consumers. Application stores or marketplaces, such as proprietary stores and alternative marketplaces are becoming widely popular and have become a target of mobile malware attacks. Mobile malware detection has proven to be an elusive and challenging target. Amongst other reasons for challenges, malware applications can easily change their signatures to trick and bypass detection by virus scanners using signatures. Moreover, performing a dynamic analysis on an application is costly and time consuming. As such, unknown malware can be challenging to detect during installation at an end user's device or when being provided at an application marketplace.

Accordingly, various embodiments disclosed herein relate to an approach to detect malware applications by generating signal tokens of an application under test (AUT) and comparing with a signal token database. In some examples, the signal token database can be previously generated. The approach offers low cost and low computational power benefits as well as providing fast detection of malware applications from benign applications at the time of installation.

The approaches described herein can be implemented using a first approach to generate the signal token database and a second approach to use the signal token database to determine whether the AUT includes malware. A static analysis engine can be used to perform byte code analysis on binaries that may be stored on a particular marketplace or multiple marketplaces to generate tokens. In certain examples, a token is a set of raw data of the application that causes a rule to fire. The binaries can be configured to run on a particular type of operating system or multiple types of operating systems. Examples of operating systems include ANDROID, WINDOWS, IOS, SYMBIAN, etc. The binaries can include a portion that are known to be clean as well as a portion that are known to have malware. The results of the byte code analysis can be run through a heuristic evaluation process to generate signal tokens that can be used to categorize unknown application as being either malware or benign. As such, in some examples, signal tokens are processed items that can be recorded as a discrete entry in a malware likeliness database of the signal tokens.

Then, a set of tokens can be generated, using static analysis, from the AUT. A set of signal tokens can be determined from the tokens using grouping rules. A classification approach (e.g., Bayesian classification) can be used to determine a likelihood of whether malware is included in the AUT.

Figure 1:
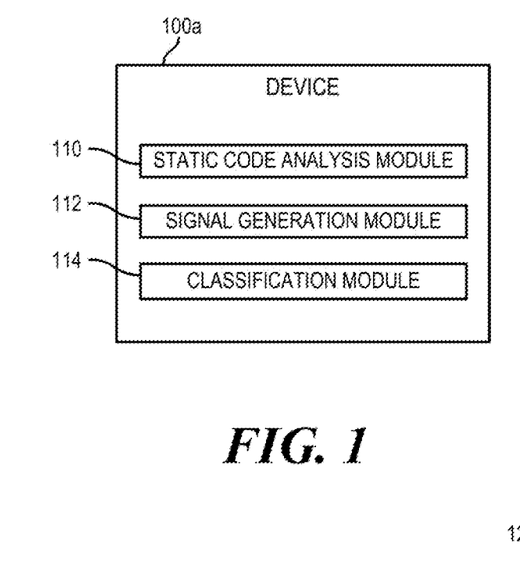
FIGS. 1 and 2 are block diagrams of computing devices capable of determine if malware is included in an application under test, according to various examples.
Figure 2:
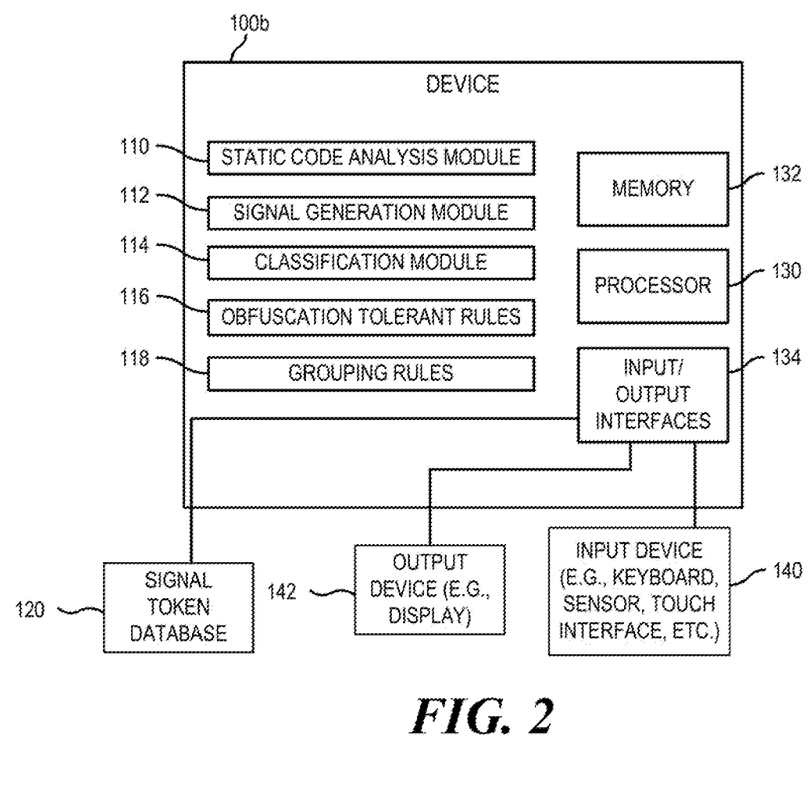

FIGS. 1 and 2 are block diagrams of computing devices capable of determine if malware is included in an application under test, according to various examples. Devices 100a, 100b include components that can be utilized to determine whether an AUT includes malware. The respective devices 100a, 100b may be a notebook computer, a desktop computer, a server, a workstation, or any other computing device capable of performing the testing functionality. In some examples, the device 100a can include a static code analysis module, a signal generation module, and a classification module 114. Further, the device 100b may include obfuscation tolerant rules, grouping rules, and may have access to a signal token database 120. Moreover, the device 100b may include at least one processor 130, memory 132, and input/output interfaces. Additionally, the computing device 100b may include and/or use one or more input device 140 or output device 142. In one example, the memory 132 can store instruction aspects of the modules 110-114 in memory 132 and the processor(s) 130 can execute the instructions.

The static code analysis module 110 can be used to determine or generate a set of tokens for an AUT according to rules. The rules can be obfuscation tolerant rules 116. The application code can be in the form of a binary or in the form of written code. In one example, the binary can be in the form of ANDROID binaries (e.g., apk files). These files can be unzipped and run through a dex2jar utility tool to convert one or more .dex files within the APK zip to jar files. The results can include a binary XML file. Another tool can be used to convert the binary XML into a readable XML format. This is a specific example of one implementation. It should be noted that other example implementations can be used specific to tools and frameworks of varying applications and/or operating systems. In some examples, pre-processing can be used to convert a binary into a form where it can be tokenized.

Tokenization is a process to break down a stream of text into words, phrases, symbols, or other meaningful elements called tokens. The list of tokens can become input for further processing by the signal generation module 112. The tokens generated can be according to rules. In some examples, the rules can include obfuscation tolerant rules 116. Obfuscation is a technique that is often applied to code to make a program more resistant to reverse engineering. Obfuscation is used by both malware to hide its malware nature as well as non-malware (e.g., to protect intellectual property from reverse engineering). Obfuscation-tolerant rules can be considered rules that work regardless of whether a program has or has not been purposefully obfuscated. Further examples of obfuscation-tolerant rules are described with reference to FIGS. 5 & 6.

Examples of rules to generate tokens include rules associated with manifest XML (e.g., rules associated with an ANDROID manifext XML file), structural rules, for example, rules that examine the structural relationship of elements within a program's abstract syntax tree and relationship types (e.g., A calls B, A is a subclass of B, C is a type used in D's method, etc.), characterization rules (e.g., to apply a technical property to a function based on a structural relationship or structural property; the technical property can be related to, e.g., dataflow entry points, passthroughs, sinks, etc.), dataflow rules (e.g., taint analysis), control flow rules (e.g., a type of analysis that matches patterns of code going through a particular call graph), semantic rules (e.g., use of certain Application Programming Interfaces (APIs)), etc. When a rule is fulfilled or hit, a token for the rule can be generated.

Rules can be highly customized for a particular language, operating system, device or device set, etc. For example, in a device capable of toll fraud, the invocation of a send text message function from within a service component of an application could be considered a strong indicator of toll fraud malware, which sends premium text messages such as short message service (SMS) messages without user consent for monetary gains.

The signal generation module 112 can process the tokens to generate a set of signal tokens based on grouping rules 118 focused on groupings of the tokens. In some examples, the grouping rules 118 can be based on signal token generation as further described in FIGS. 5 & 6. The signal tokens can be used in a malware determination process based on a classification technique, such as Bayesian classification. Bayesian classification is an approach that can be used to minimize the probability of misclassification. Other types of classification training that minimizes the probability of misclassification can be used as well, such as text classification. In spam filtering, Bayesian spam filtering is used to calculate the probability that an email is or is not spam. Similar approaches can be used to determine whether malware is or is not present because of the presence of one or more tokens.

The classification module 114 can compare the set of signal tokens generated for the AUT with a signal token database 120 to determine a likelihood of whether malware is included in the AUT. The signal token database 120 can include information that is preprocessed to have a likeliness of malware associated with the respective signal tokens in the database. Some of the signal tokens can be associated with malware while others are associated with being benign and/or not descriptive of malware or benign nature. Further, the signal tokens may be associated with a score of how likely it is that malware is associated with the signal token. Further description of the signal token database is detailed in FIGS. 4, 5, & 6. The preprocessing of the signal token database can work in a process described below using Naïve Bayes classifiers to correlate signal tokens with malware and non-malware sets of application code.

The classification module 114 can use Bayesian inference to calculate the probability that the AUT is malware or not malware. As noted, other similar classification approaches can be used. Examples of other techniques include approaches of spam filters, such as CRM114, DSPAM, BOGOFILTER, etc. The classification module 114 can use likelihood functions or token probabilities to compute the probability that the AUT is associated with a malware category. Each token of the AUT can contribute to the AUT's malware probability, or a set of the tokens can contribute to the AUT's malware probability (e.g., the most interesting tokens or signal tokens). The AUT can be considered or categorized as including malware if the malware probability calculated exceeds a predetermined threshold. The threshold can change based on customization.

A processor 130, such as a central processing unit (CPU) or a microprocessor suitable for retrieval and execution of instructions and/or electronic circuits can be configured to perform the functionality of any of the modules 110, 112, 114 described herein. In certain scenarios, instructions and/or other information, such as obfuscation tolerant rules 116 and grouping rules 118, can be included in memory 132 or other memory. Input/output interfaces 134 may additionally be provided by the computing device 100b. For example, input devices 140, such as a keyboard, a sensor, a touch interface, a mouse, a microphone, etc. can be utilized to receive input from an environment surrounding the computing device 100b. Further, an output device 142, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 134.

Each of the modules 110, 112, 114 may include, for example, hardware devices including electronic circuitry for implementing the functionality described herein. In addition or as an alternative, each module 110, 112, 114 may be implemented as a series of instructions encoded on a machine-readable storage medium of device 100 and executable by at least one processor 130. It should be noted that, in some embodiments, some modules are implemented as hardware devices, while other modules are implemented as executable instructions.

Figure 3:
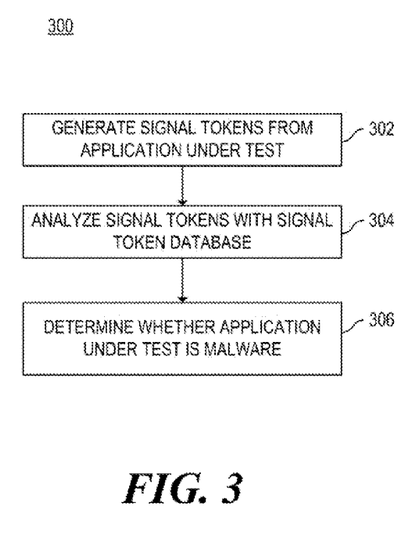
FIG. 3 is a flowchart of a method for determining whether an application under test is malware, according to one example.

FIG. 3 is a flowchart of a method for determining whether an application under test is malware, according to one example. Although execution of method 300 is described below with reference to computing device 100, other suitable components for execution of method 300 can be utilized (e.g., computing device 700). Additionally, the components for executing the method 300 may be spread among multiple devices. Method 300 may be implemented in the form of executable instructions stored on a machine-readable storage medium, such as storage medium 720, and/or in the form of electronic circuitry.

At 302, a set of signal tokens can be generated from an application under test (AUT) according to obfuscation tolerant rules and grouping rules, in one example, tokens are generated according to the obfuscation tolerant rules as described herein and then grouping rules can be used to process the tokens to generate signal tokens.

At 304, the signal tokens can be analyzed with a signal token database. The signal token database can include another set of signal tokens. The respective signal tokens of the database can be associated with malware likeliness. The malware likeliness can be based on a machine learning technique (e.g., using Naïve Bayes classifiers) as further detailed in FIGS. 5 & 6. The analysis can use a Bayesian technique or other classification technique to determine a likelihood that the AUT includes malware.

In one example, the probability that an application, given a single signal token can be based on one or more formulas. In this example, $Pr(M|T)=Pr(T|M)*Pr(M)/[Pr(T|M)*Pr(M)+Pr(T|B)*Pr(B)]$ can be used as a formula. $Pr(M|T)$ can be the probability that the token is malware, knowing that a particular tokens or signal token is in the AUT, $Pr(M)$ is the overall probability that any given application is malware (this can be based on a ranking of the origin of the AUT or other metrics) $Pr(T|M)$ is the probability that a token appears in malware applications. $Pr(B)$ is the overall probability that any given token is not related to malware or is benign. $Pr(T|B)$ is the probability that the token appears in benign or non-malware applications.

In another example, the probability that the AUT is malware can be based on a more complex formula, for example, based on combinations of individual probabilities. For example, $p=p1p2 \ldots pN/(p1p2 \ldots pn+(1-p1)(1-p2)\ldots(1-pN))$, where p is the probability that the AUT is associated with malware. Further, p1 is the probability that $p(M|T1)$ that it is malware knowing it contains a first token. Moreover, pN is the probability $p(M|TN)$ that it is a malware application knowing it contains an Nth token.

Various customizations can be made to the analysis process. In one example, the classification module 114 can use a presumption that there is no a priori reason for the AUT to be malware. Further, other classification formulas can be used. At 306, the device 100 can determine whether the AUT is malware based on the analysis. In one example, if the likelihood that the AUT is associated with malware is above a threshold level, the AUT can be classified as malware. The phrase "is malware" can be a classification that the AUT is associated with malware.

Figure 4:
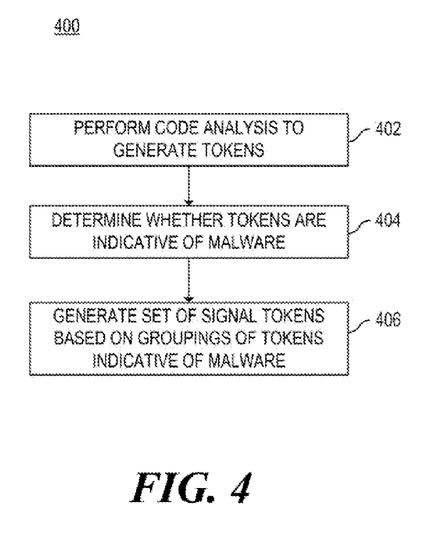
FIG. 4 is a flowchart of a method for generating signal tokens based on groupings of tokens indicative of malware, according to one example.

FIG. 4 is a flowchart of a method for generating signal tokens based on groupings of tokens indicative of malware, according to one example. Although execution of method 400 is described below with reference to computing device 500, other suitable components for execution of method 400 can be utilized. Additionally, the components for executing the method 400 may be spread among multiple devices. Method 400 may be implemented in the form of executable instructions stored on a machine-readable storage medium, and/or in the form of electronic circuitry.

At 402, the computing device can perform code analysis based on rules on a first set of known malware application code (e.g., using binaries of the application) and a second set of known clean application code (e.g., using binaries of the applications) to generate tokens. In the case of a binary, the binary can be pre-processed as discussed herein. Further, as noted above, the rules can include obfuscation tolerant rules.

At 404, a set of the tokens indicative of malware can be determined. The set can be determined based on machine learning processing of the tokens and their respective associations with clean or malware code. For example, tokens generated largely from both can indicate that the token need not be used in malware analysis, whereas tokens generated more in malware containing code can be considered more indicative of malware. In some examples, a score or other evaluation can be associated with the respective tokens to determine the likeliness that the particular token is indicative of malware.

At 406, the computing device generates a set of signal tokens based on groupings of the tokens indicative of malware. In some examples, the signal tokens are based on machine learning. The machine learning can be based on training sets of applications associated with malware and applications that are known to be benign. The machine learning can be based on Naïve Bayesian classification techniques. In other examples, other machine learning tools can be used. As noted above, in some examples, groupings can include at least one of, at least two of: toll fraud, rooting, abuse of permissions, application installed as a service, sensitive data retrieval, use of reflection, use of dynamic loading, and privacy violations. Other groupings can be based on other types of malware. Groupings can also be based on clustering or density of one or more tokens generated.

In one example, toll fraud can include the use of a send text message function. Further, rooting can include gaining privileged access to a computing device executing an application. Moreover, abuse of permissions can include requesting permissions above a particular threshold. Further, sensitive data retrieval can include a call to an API to retrieve device specific information. Additionally, reflection can include the use of a function to download further instructions (e.g. from a server). The signal tokens can be stored in another location and may be used by another device or the computing device to process an application binary or code to determine whether the application binary or code includes malware.

Figure 5:
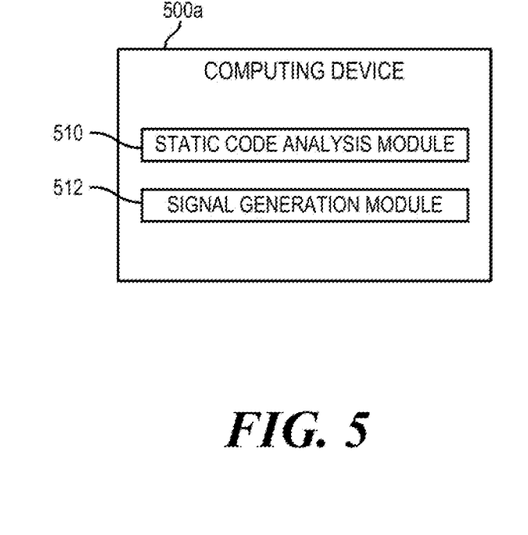
FIGS. 5 and 6 are block diagrams of computing devices capable of generating signal tokens indicative of malware, according to various examples.
Figure 6:
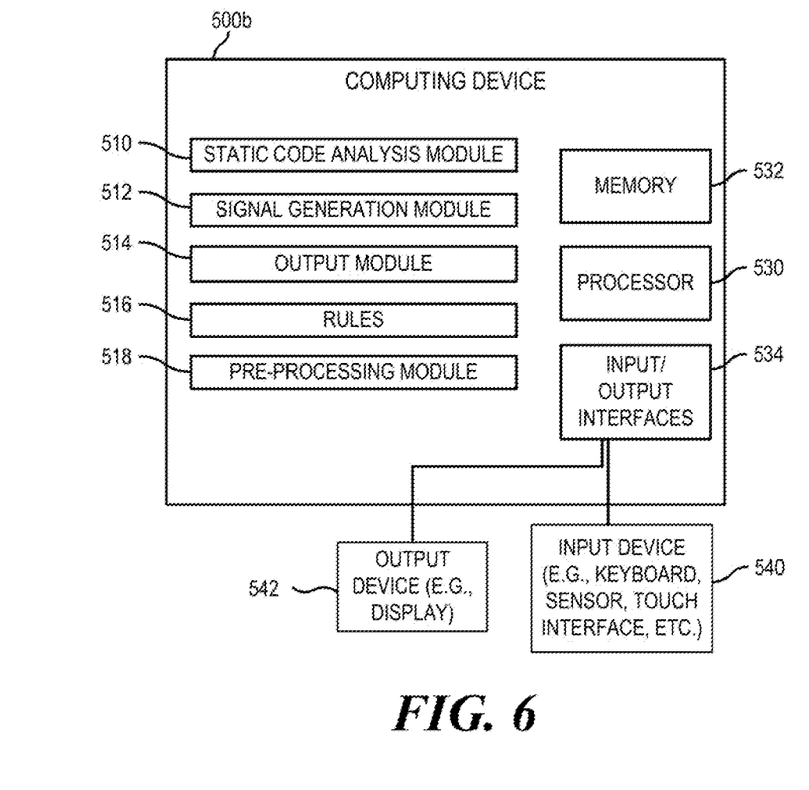

FIGS. 5 and 6 are block diagrams of computing devices capable of generating signal tokens indicative of malware, according to various examples. Computing devices 500a, 500b include components that can be utilized to generate signal tokens that can be used to determine whether application code or an application binary includes malware. The respective computing devices 500a, 500b may be a notebook computer, a desktop computer, a tablet computing device, a wireless device, a server, a workstation, or any other computing device. In some examples, the computing device 500 can connect to one or more databases including one or more sets of application code that are known to either include malware or not include malware. Further, the application code can be in the form of binary or another form (e.g., as a written language, Extensible Markup Language (XML), etc.).

The computing device 500 may include a static code analysis module 510 and a signal generation module 512. The computing device 500 can further include an output module 514, rules 516, a pre-processing module 518 at least one processor 530, memory 532, and input/output interfaces 534. Moreover, the computing device 500b may include and/or use one or more input device 540 or output device 542. In one example, the memory 532 can store instruction aspects of the modules 510-514, 518 in memory 532 and the processor(s) 530 can execute the instructions.

The static code analysis module 510 can be used to determine a first and second set of tokens based on a static code analysis respectively performed on a first set of known malware application code and a second set of known clean application code. As noted above, the application code can be in the form of binaries. In one example, the binaries can be in the form of ANDROID binaries (e.g., apk files). These files can be unzipped and run through a dex2jar utility tool to convert one or more .dex files within the APK zip to .jar files. The results can include a binary XML file. Another tool can be used to convert the binary XML into a readable XML format. This is a specific example of one implementation. It should be noted that other example implementations can be used specific to tools and frameworks of varying applications and/or operating systems. In some examples, a preprocessing module 518 can be used to convert a binary into a form where it can be tokenized.

Tokenization is a process to break down a stream of text into words, phrases, symbols, or other meaningful elements called tokens. The list of tokens can become input for further processing by the signal generation module 512. In some examples, the tokens can be marked as being associated with malware binaries/code or being associated with benign or clean binaries/code. The information can be tagged to individual tokens or the tokens can be monitored in another way, for example, by separating the tokens into sets, listing the tokens in another data structure, etc.

The tokens generated can be according to rules 516. In some examples, the rules can include obfuscation tolerant rules. Obfuscation is a technique that is often applied to code to make a program more resistant to reverse engineering. Obfuscation is used by both malware to hide its malware nature as well as non-malware (e.g., to protect intellectual property from reverse engineering). Obfuscation-tolerant rules can be considered rules that work regardless of whether a program has or has not been purposefully obfuscated.

In one example, taint analysis can be used. Taint analysis attempts to identify variables that have been 'tainted' and traces them to possible vulnerable functions that can be considered a 'sink.' If a tainted variable gets passed to a sink without first being sanitized, it can be flagged.

In a specific example of malware associated with toll fraud, malware would call a function to send a text message to a destination address and a payload. The malware program would need to provide the method with relevant parameters. To hide its intent, the malware may use encryption for the various addresses and use an overly complicated call graph (e.g., A calls B calls C call D, which calls the function to send the text message). An obfuscation tolerant rule in this case could put a taint on the encrypted string constant and a sink on the destination address. This would work if the call-graph was simple and not obfuscated or complicated by purposeful obfuscation.

Other examples of rules to generate tokens include rules associated with manifest XML (e.g., rules associated with an ANDROID manifest XML file), structural rules, for example, rules that examine the structural relationship of elements within a program's abstract syntax tree and relationship types (e.g., A calls B, A is a subclass of B, C is a type used in D's method, etc.), characterization rules (e.g., to apply a technical property to a function based on a structural relationship or structural property; the technical property can be related to, e.g., dataflow entry points, passthroughs, sinks, etc.), dataflow rules (e.g., taint analysis), control flow rules (e.g., a type of analysis that matches patterns of code going through a particular call graph), semantic rules (e.g., use of certain Application Programming Interfaces (APIs)), etc. When a rule is fulfilled or hit, a token for the rule can be generated. In one example, tokens can be associated with each application. In another example, the tokens can be associated with either being associated with a known malware application or a known clean application.

Rules can be highly customized for a particular language, operating system, device or device set, etc. For example, in a device capable of toll fraud, the invocation of a send text message function from within a service component of an application could be considered a strong indicator of toll fraud malware, which sends premium text messages such as short message service (SMS) messages without user consent for monetary gains.

Another example is rooting the device. In the case of a LINUX based operating system, such as ANDROID, applications can be considered LINUX processes with access limited to their own process space. Rooting the device to gain privileged access typically involves use of LINUX commands such as su, chmod, chown, etc. Detecting the presence of these commands can raise flags on the suspicious nature of an application. These can be considered privileged access indicators.

Another example is the abuse of a permission model. In some examples, an operating system may require applications to request user permission during installation for access to system services. Malware applications tend to request permissions, from unsuspecting users, to system resources that may compromise user privacy and/or security. Examples can be specific to the type of operating systems and can include call privileges, access location privileges, access to contacts, processing of outgoing calls, reading a call log, reading a calendar, reading external storage, recording audio, using other peripheral devices (e.g., a camera) or input/output interfaces 534, etc.

Further, one example includes applications installed as services. These applications may use system intent in this scenario. On receiving an intent (e.g., boot complete), the application can start a malicious service silently in the background to harvest user data or communicate with central control and command servers without user content or knowledge. Applications that register for the event to run as services may be targeted by rules for further scrutiny.

Moreover, rules can target calls to sensitive APIs such as APIs to retrieve phone specific information such as device IDs, location information (e.g., cell information positioning system information, etc.), serial numbers of SIM cards, etc. from within service components.

Another example includes the use of reflection and/or dynamic loading of executables. JAVA reflection capabilities to dynamically load binaries at runtime may be abused by malware to download instructions and malicious binaries from a central command and control server. Operating system APIs that create subprocesses and/or JAVA API calls such as calls to load( ), loadClass( ), loadLibrary( ), forName( ), and getMethod( ) that would facilitate use of dynamic features can indicate malware.

Additionally, another example includes a privacy violation. Access and/or mishandling of sensitive information such as writing sensitive information to external storage (e.g., via a write call to getExternalStorage( )), or system logs with a Log.w( ) can be considered a sign of negligence and/or abuse of user information by an application and can be flagged by rule to generate a token.

The presence of any one of these features may not be sufficient to classify an application as malware, but the presence of multiple of these features together with a density and/or collocation of these features can be used to perform a heuristic evaluation of an application to classify the application as malware or benign. Machine learning can be used to create signal tokens from sets of tokens generated by the rules. Further, a one or more signal tokens can be grouped based on density and/or collocation of features/tokens. In some examples, the grouping can be based on the amount of these features within a certain code segment, function, etc.

The signal generation module 512 can process the tokens to generate a set of signal tokens that are indicative of malware based on groupings of the tokens. The signal tokens can be used in a malware determination process based on Bayesian classification. Bayesian classification is an approach that can be used to minimize the probability of misclassification. Other types of classification training that minimizes the probability of misclassification can be used as well, such as text classification. In spam filtering, Bayesian spam filtering is used to calculate the probability that an email is or is not spam. Similar approaches can be used to determine whether malware is or is not present because of the presence of one or more tokens.

Training sets can be tokens associated with each respective application as well as whether or not the respective application includes malware or is benign. Groupings of two or more of the tokens can be used to generate the signal tokens. For example, the training can notice that certain tokens are common to each application and therefore are not indicative of malware, but a combination of multiple tokens can be used to detect malware (e.g., because the combination is present in multiple malware application code, but not in benign application code). In one example, the training can further be based on one or more rules or criteria. For example, a set of tokens can be used to generate a signal token if the number of tokens across multiple malware applications is above a threshold level. Moreover, the signal token generation can further be qualified by not being associated with more than a second threshold number of benign applications. As such, the training allows the signal token database to represent a real, discrete, and/or non-correlated application property. In one example, a real property is a property that represents an aspect of an application. In another example, a discrete property is one that is need not be broken down further and thus need not be a rollup of multiple properties unless for a particular reason. A non-correlated property represents that each signal token can be linearly independent of other signal tokens. As such, if multiple signal tokens are used in a particular Bayes analysis of an application, a real aspect of the application need not be overly considered (e.g., signal tokens that represent the same real aspect of the application need not be considered separately).

In one example, malware may tend to include a high percentage of findings per line of code when compared to non-mobile or benign mobile applications. Moreover, in addition to a high density of semantic issues that fingerprint malware exploits, malware applications are often poorly coded and/or include a high percentage of control flow and data flow security vulnerabilities that can be used to generate remote attacks. As such, in some examples, the groupings can be based on at least one or at least two of a null dereference, resource leak, dead code, path manipulation, query string injection, command injection, resource injection, poor style, bad practices, and denial of service. Some of these, such as dead code and having poor style may be intentionally embedded to distract reverse engineering and/or intrusion detection efforts. Others, such as path manipulation and resource injection may be left as security holes to allow for remote control and attack of the device. Moreover, the presence of bad practices issues such as calls to System.exit( ), System.gc( ), and Thread.sleep( ) that can generate denial of service attacks or collect system information for future attacks may be parts of the groupings.

Other groupings can also be used. Moreover, groupings can be based on a correlation between the presence of certain application features, which can be flagged by specialized malware rules, and malware applications. Moreover, in malware applications, findings of the features are not typically isolated, but found in clusters suggesting a high probability of malicious intent. In one example, the malware application can be identified because the malware application retrieves multiple types of device specific data. For example, the malware application would retrieve all of the device specific attributes, such as device ID, SIM card identifier, line number, etc. As noted above, the groupings signaling malware can be based on machine learning techniques.

The output module 514 can output the signal tokens to a signal token malware likeness database. The database can be used by the computing device 500 or another computing device to analyze an unknown application, where the unknown modifier indicates that it is not known whether the application includes malware or is benign. A static analysis can be run using a rule portfolio (e.g., the rules used to generate the tokens) on the unknown application. The malware likeliness database and the signal tokens from the unknown application can be fed into a Bayesian Classification technique to make a determination as to whether the unknown application includes malware.

A processor 530, such as a central processing unit (CPU) or a microprocessor suitable for retrieval and execution of instructions and/or electronic circuits can be configured to perform the functionality of any of the modules 510, 512, 514, 518 described herein. In certain scenarios, instructions and/or other information, such as rules 516, can be included in memory 532 or other memory. Input/output interfaces 534 may additionally be provided by the computing device 500b. For example, input devices 540, such as a keyboard, a sensor, a touch interface, a mouse, a communication interface, a microphone, etc, can be utilized to receive input from an environment surrounding the computing device 500b. Further, an output device 542, such as a display, can be utilized to present information to users. Examples of output devices include speakers, display devices, amplifiers, etc. Moreover, in certain embodiments, some components can be utilized to implement functionality of other components described herein.

Each of the modules 510, 512, 514, 518 may include, for example, hardware devices including electronic circuitry for implementing the functionality described herein. In addition or as an alternative, each module 510, 512, 514, 518 may be implemented as a series of instructions encoded on a machine-readable storage medium of computing device 500 and executable by processor 530. It should be noted that, in some embodiments, some modules are implemented as hardware devices, while other modules are implemented as executable instructions.

Figure 7:
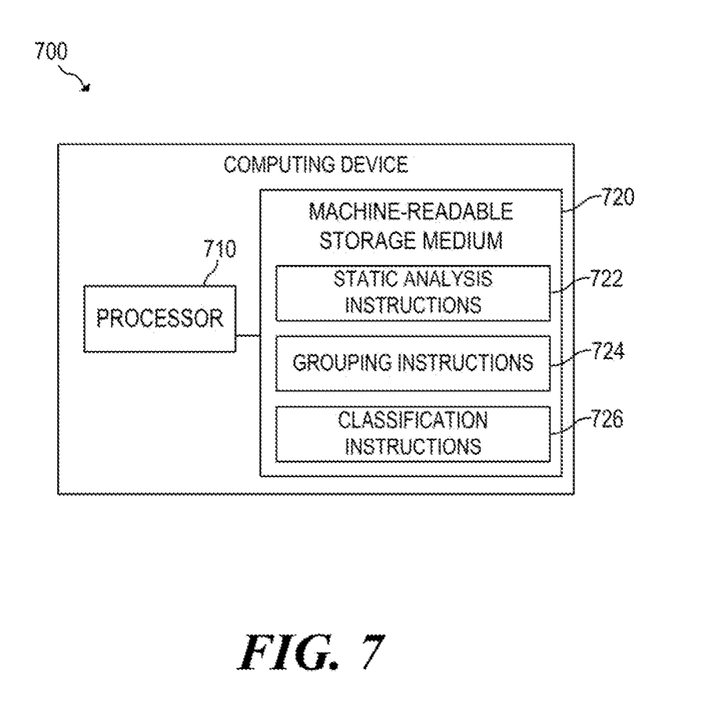
FIG. 7 is a block diagram of a computing device capable of determining if malware is included in an application under test using signal tokens, according to one example.

FIG. 7 is a block diagram of a computing device capable of determining if malware is included in an application under test using signal tokens, according to one example. The computing device 700 includes, for example, a processor 710, and a machine-readable storage medium 720 including instructions 722, 724, 726 for determining malware in an AUT using signal tokens. Computing device 700 may be, for example, a notebook computer, a desktop computer, a server, a workstation, or another computing device.

Processor 710 may be, at least one central processing unit (CPU), at least one semiconductor-based microprocessor, at least one graphics processing unit (GPU), other hardware devices suitable for retrieval and execution of instructions stored in machine-readable storage medium 720, or combinations thereof. For example, the processor 710 may include multiple cores on a chip, include multiple cores across multiple chips, multiple cores across multiple devices (e.g., if the computing device 700 includes multiple node devices), or combinations thereof. Processor 710 may fetch, decode, and execute instructions 722, 724, 726 to implement determine whether malware is included in an AUT based on signal tokens. As an alternative or in addition to retrieving and executing instructions, processor 710 may include at least one integrated circuit (IC), other control logic, other electronic circuits, or combinations thereof that include a number of electronic components for performing the functionality of instructions 722, 724, 726.

Machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 720 may be encoded with a series of executable instructions for determining whether the AUT includes malware.

Static analysis instructions 722 and grouping instructions 724 can be executed by processor 710 to generate a set of signal tokens from the AUT according to obfuscation tolerant rules and grouping rules as described above. Static analysis can be used to determine tokens and the grouping rules can be used to generate signal tokens from the group of tokens. In some examples, the grouping rules can be based on at least one or at least two of a null dereference, resource leak, dead code, path manipulation, query string injection, command injection, resource injection, and denial of service.

Classification instructions 726 can be executed to analyze the set of signal tokens with a signal token database including another set of signal tokens to determine a likelihood that the AUT is malware. The analysis can be based on a Bayesian technique. The signal tokens in the database can be preprocessed to have a likeliness of malware based on a training set. This can be accomplished, for example, using a naïve Bayes classifier on the signal tokens as described above. Moreover, the signal tokens of the database can be based on groupings of tokens generated by static analysis of other tokens generated by a tokenization of a first set of known malware application code and a second set of known clean application code as the training set. If the likelihood that the AUT is malware is above a threshold level, the AUT can be considered and/or classified as malware or including malware.

What claimed is:

1. A computing device comprising:
a memory and at least one hardware processor to execute a plurality of modules including:
a static code analysis module to generate a set of tokens from an application under test according to obfuscation tolerant rules, wherein each token of the set of tokens is generated upon a hit to one of the obfuscation tolerant rules;
a signal generation module to generate a plurality of signal tokens from the set of tokens using a set of grouping rules, wherein each signal token is generated from a grouping of multiple tokens based on a grouping rule; and
a classification module to perform a Bayes classification to compare the plurality of signal tokens with a signal token database to determine a likelihood of whether malware is included in the application under test.

2. The computing device of claim 1, wherein the static code analysis further includes at least two of dataflow sources, structural rules, manifest Extensible Markup Language, semantic analysis, and control flow.

3. The computing device of claim 1, wherein the signal token database includes a second plurality of signal tokens generated from a machine learning analysis of a set of known malware application code and a set of clean application code.

4. The computing device of claim 3, wherein the second plurality of signal tokens is generated from groupings of tokens from a second set of tokens, wherein the second set of tokens is generated by a tokenization of the set of known malware application code and the set of known clean application code.

5. The computing device of claim 4, wherein the second plurality of signal tokens is generated using the set of grouping rules.

6. The computing device of claim 1, wherein the grouping rules are based on at least two of a null dereference, resource leak, dead code, path manipulation, query string injection, command injection, resource injection, or denial of service.

7. The computing device of claim 3, wherein the signal tokens of the signal token database are associated with respective malware likeliness values based on the machine learning analysis.

8. A non-transitory machine-readable storage medium storing instructions that, if executed by at least one hardware processor of a device, cause the device to:
generate a set of tokens from an application under test according to obfuscation tolerant rules, wherein each token of the set of tokens is generated upon a hit to one of the obfuscation tolerant rules;
generate a plurality of signal tokens from the set of tokens using a set of grouping rules, wherein each signal token is generated from a grouping of multiple tokens based on a grouping rule;
use a Bayes classification technique to analyze the plurality of signal tokens with a signal token database including a second plurality of signal tokens to determine a likelihood that the application under test is malware, wherein each of the second plurality of signal tokens is preprocessed to have a likeliness of malware based on a training set; and
determine that the application under test is malware if the likelihood is above a threshold level.

9. The non-transitory machine-readable storage medium of claim 8, wherein the second plurality of signal tokens is based on groupings of other tokens generated by tokenization of a first set of known malware application code and a second set of known clean application code as the training set.

10. The non-transitory machine-readable storage medium of claim 8, wherein the grouping rules are based on at least two of a null dereference, resource leak, dead code, path manipulation, query string injection, command injection, resource injection, and denial of service.

11. A method comprising:
generating, by a hardware processor, a set of tokens from an application under test according to obfuscation tolerant rules, wherein each token of the set of tokens is generated upon a hit to one of the obfuscation tolerant rules;
generating, by the hardware processor, a plurality of signal tokens from the set of tokens using a set of grouping rules, wherein each signal token is generated from a grouping of multiple tokens based on a grouping rule;

using, by the hardware processor, a Bayesian technique to analyze the plurality of signal tokens with a signal token database including a second plurality of signal tokens to determine a likelihood that the application under test includes malware, wherein each of the second plurality of signal tokens is preprocessed to have a likeliness of malware based on a training set; and determining, by the hardware processor, that the application under test is malware if the likelihood is above a threshold level.

12. The method of claim 11, wherein the second plurality of signal tokens is based on groupings of other tokens generated by the tokenization of a first set of known malware application code and a second set of known clean application code.

13. The method of claim 11, wherein the grouping rules are based on at least two of a null dereference, resource leak, dead code, path manipulation, query string injection, command injection, resource injection, and denial of service.

14. The method of claim 11, wherein the second plurality of signal tokens is generated from a machine learning analysis of a set of known malware application code and a set of clean application code.

15. The method of claim 14, wherein the signal tokens of the signal token database are associated with respective malware likeliness values based on the machine learning analysis.

16. The non-transitory machine-readable storage medium of claim 8, wherein the second plurality of signal tokens is generated from a machine learning analysis of a set of known malware application code and a set of clean application code.

17. The non-transitory machine-readable storage medium of claim 8, wherein the signal tokens of the signal token database are associated with respective malware likeliness values based on the machine learning analysis.

* * * * *